United States Patent [19]
Höfer et al.

[11] Patent Number: 4,660,380
[45] Date of Patent: Apr. 28, 1987

[54] HYDRAULIC CONTROL ARRANGEMENT

[75] Inventors: Friedrich-Wilhelm Höfer, Ditzingen; Günther Schwerin, Möglingen, both of Fed. Rep. of Germany

[73] Assignee: Robert Bosch GmbH, Stuttgart, Fed. Rep. of Germany

[21] Appl. No.: 560,426

[22] Filed: Dec. 12, 1983

[30] Foreign Application Priority Data

Dec. 30, 1982 [DE] Fed. Rep. of Germany ....... 3248606
May 18, 1983 [DE] Fed. Rep. of Germany ....... 3318052

[51] Int. Cl.$^4$ ............................................. F16D 31/02
[52] U.S. Cl. ........................................ 60/422; 60/427; 91/445; 91/448
[58] Field of Search .................. 60/420, 422, 423, 427; 91/452, 528, 531, 445, 448

[56] References Cited

U.S. PATENT DOCUMENTS 4,122,865 10/1978 Budzich ................................ 91/421
4,413,472 11/1983 Lang ..................................... 60/420

FOREIGN PATENT DOCUMENTS 2702953 10/1977 Fed. Rep. of Germany .
3029485 3/1982 Fed. Rep. of Germany ........ 60/427
3102505 8/1982 Fed. Rep. of Germany .

*Primary Examiner*—Edward K. Look
*Attorney, Agent, or Firm*—Michael J. Striker

[57] ABSTRACT

A hydraulic control arrangement for regulating a lifting device in an agricultural vehicle has a proportionally operating regulating directional valve which includes a blocking unit, a control slider controlling said blocking unit and connected with a throttling valve so that its throttle slider during lifting operates as a pressure compensation valve and during lowering as a pressure reducing valve, and a spring associated with the throttle slider is only insignificantly stronger than the regulating spring in an adjusting device of an adjusting pump, so that during actuation of the throttle slider depending upon the high load pressure of a parallel-operating second hydromotor, the pressure differential required for the lifting stream at the control slider and the pressure differential acting during lowering in the first control conduit remain substantially constant.

13 Claims, 2 Drawing Figures

HYDRAULIC CONTROL ARRANGEMENT

BACKGROUND OF THE INVENTION

The present invention relates to an hydraulic control arrangement for an hydromotor-driven working device, particularly mounted on an agricultural machine.

Hydraulic control arrangements of the above mentioned general type are known in the art. One such arrangement is disclosed, for example, in DE-OS No. 3,102,505. The control arrangement disclosed there has a regulating valve for proportionally controlling a pressure medium stream to a single-acting hydromotor, wherein the regulating valve for satisfying high tightness requirements secures the hydromotor by a blocking unit. A control slider influencing the pressure medium stream to the hydromotor cooperates with a preceding auxiliary slider which can be formed as a three-way stream regulator. This control arrangement has the disadvantage that the auxiliary slider is a part of a switch valve, and therefore the regulating valve can be used only in an open circuit. Thereby, this control arrangement is not suitable for a closed circuit. In addition, the control arrangement does not operate as a load-pressure-dependent system, which in certain conditions can lead to increased energy losses.

Another hydraulic control arrangement is disclosed in U.S. Pat. No. 3,592,216. This hydraulic arrangement as shown in FIG. 4 has a load-pressure-dependent operating system with two double-acting hydromotors which are supplied via a directional valve from an adjustment pump independently from one another with pressure medium. The adjusting pump is adjusted by a regulating spring in an associated adjusting device and also by the selectable maximum load pressure in direction of maximum feeding quantity. Though this control arrangement operates in advantageous manner as a load-pressure-dependent system in a closed circuit, it has the disadvantage that, for controlling of double-acting hydromotors, it operates with suitable directional valves with two motor connections and therefore is expensive. In addition, the direction valves without blocking seat valves do not satisfy high tightness requirements. For controlling a single-acting hydromotor this control arrangement does not suit well. Moreover, the regulating valves operate with different supply pressures, whereby the sensitivity for controlling changes in undesirable manner.

A further hydraulic control arrangement is disclosed in DE-OS No. 2,702,953. In this control arrangement, a guide valve is supplied from a load-pressure-dependently controlled adjusting pump with pressure medium. For excluding variations of the sensitivity of the guide valve when different adjusting pumps are used with different supply pressures, this arrangement is provided with a pressure drop valve connected between the adjusting pump and the guide valve. By exchange of the spring in the pressure drop valve, the pressure drop available at the guide valve and therefore its sensitivity can be kept constant in the event of utilization of different adjusting pumps with different supply pressures. This control arrangement operates in advantageous manner as a load-pressure-dependent system in a closed circuit. However, it has the disadvantage that it is little suitable for controlling a single-acting hydromotor which in addition must be blocked especially tightly. Moreover, the change of a spring is in many cases expensive and undesirable.

SUMMARY OF THE INVENTION

Accordingly, it is an object of the present invention to provide an hydraulic control arrangement which avoids the disadvantages of the prior art.

More particularly, it is an object of the present invention to provide an hydraulic control arrangement which provides for simultaneously all advantages of the known arrangements, so that it makes possible to form a load-pressure-dependently operating and energy-saving control arrangement with which a single-acting hydromotor can be controlled exactly and reliably.

It is particularly an object of the present invention to provide such an hydraulic control arrangement in which, with an additional parallel-operating hydromotor and thereby with strongly fluctuating supply pressures, the regulating valve operates during lifting and during lowering with constant sensitivity.

It is also an object of the present invention to provide such a control arrangement which during lowering of the single-acting hydromotor the energy loss is kept very low, when an additional hydromotor works with a maximum load pressure. A blocking unit always provides for reliable sealing of the hydromotor.

It is an especially advantageous object of the present invention to provide such a control arrangement in which during the lifting step of the first hydromotor a throttling slider operating in a working pressure medium stream as a pressure compensating slider is formed and connected such that simultaneously during a lowering step it is located in a control stream and operates as a pressure reducer and independently on the pump pressure provides for a constant control pressure for the lowering stream regulation. Therefore a simple construction is obtained.

In keeping with these objects and with others which will become apparent hereinafter, one feature of the present invention resides, briefly stated, in a hydraulic control arrangement in which adjusting means is provided including an adjusting pump connected with an inlet and an adjusting device loaded by a working pressure from the adjusting pump in direction of reducing feeding quantity and from a regulating spring of the adjusting means in direction of increasing feeding quantity, a cylinder chamber associated with the regulating spring is connected via a maximum pressure-selecting valve with a spring chamber of the throttle valve or with a load pressure pick-up of a directional valve associated with a second hydromotor, a control conduit to a pushing piston of a blocking unit leads via an additional throttle point to a tank and branches downstream of the control slider from a working conduit, and a pressure chamber at the throttle slider is connected with the working conduit downstream of said throttle slider.

In accordance with another feature of the present invention, the regulating spring of the adjusting means produces a pressure which is only insignificantly smaller than the pressure produced by the spring of the throttle valve. In this case at the control pressure a relatively high pressure drop is available, and therefore the sensitivity of the regulating valve for a single-acting consumer can automatically be kept constant.

A further feature of the present invention is that the pressure produced by the spring at the throttle slider is substantially smaller than the pressure produced by the regulating spring of the adjusting means. In this case at the control slider there is no longer a drop of the output pressure produced by the regulating spring of the adjusting pump and known as standby pressure, but instead there is only the pressure drop produced by the spring at the throttle slider and being considerably lower. During lifting or lowering, the operation can be carried out with a smaller pressure drop. This has the advantage that the control slider can be formed as such a structural element which can be used in open pressure medium circuits and can operate with low pressure drop. In addition, the weaker spring at the throttle slider has the advantage with regard to characteristic line, structural space and costs. Furthermore, with a weak spring the control bevel at the throttle slider is always in regulating engagement, so that during connection of another consumer the pressure drops via the control slider remains unchanged and small springing which can take place in a strong spring is automatically eliminated.

It is especially advantageous when the throttle slider has a control face which operates opposite to its control bevel and controls a connection from a discharge chamber to a spring chamber of the throttle valve. Thereby drifting of the throttle slider in the region of its regulating position is avoided, and it assumes an exactly definite position which facilitates design of the spring at the throttle slider. The pressure drop available at the control slider can be thereby exactly maintained.

Finally, still a further feature of the present invention is that only one control chamber is arranged between the supply-side working chamber and the discharge chamber at the control slider. This provides for an exceptionally compact control arrangement with only one control chamber at the control slider.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
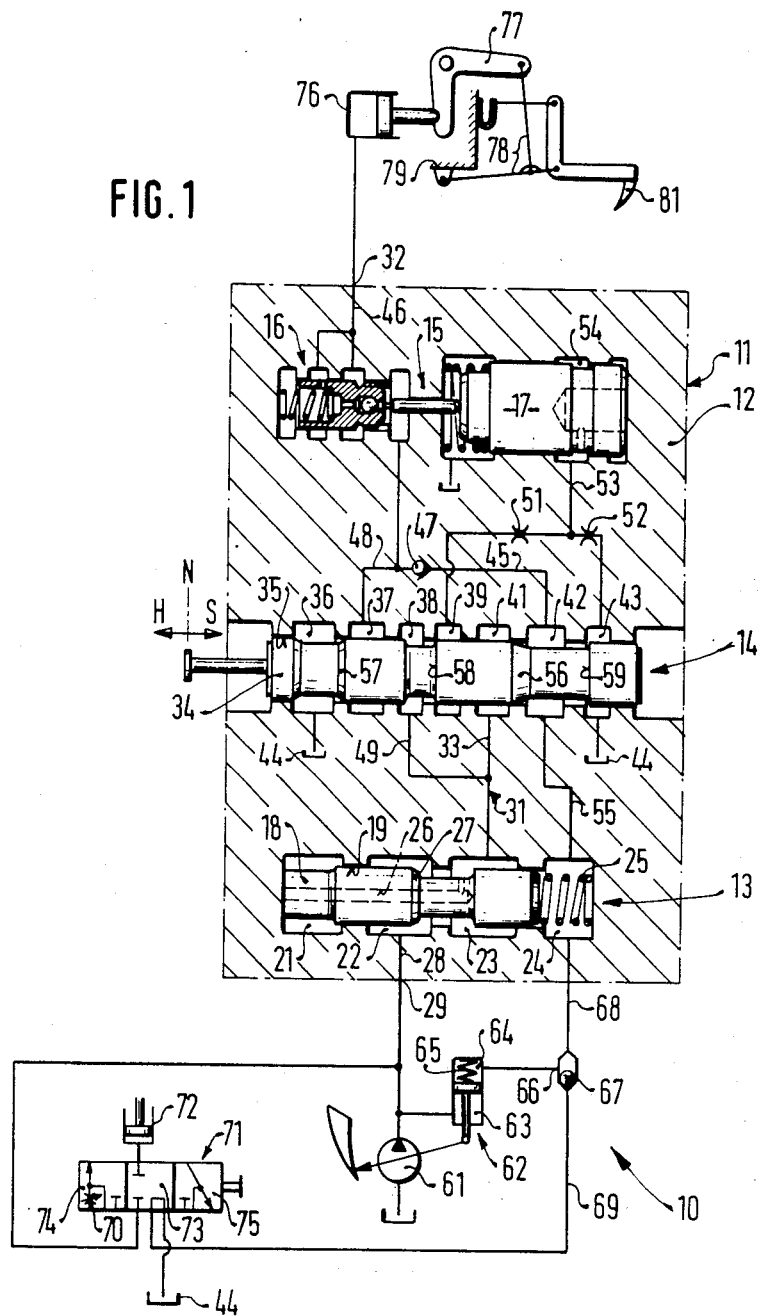
FIG. 1 is a view showing a longitudinal section of an hydraulic control arrangement in accordance with the present invention, in a neutral position.

A control arrangement in accordance with the present invention is shown in FIG. 1 and identified with reference numeral 10. It has a regulating directional valve 11 and is used for a lifting device of an agricultural vehicle, for example a tractor with an articulately coupled plow.

The regulating directional valve 11 has a housing 12. A throttle valve 13, a control valve 14, and a blocking unit 15 including a non-return valve 16 and an associated pushing piston 17 are arranged in the housing 12 along three mutually parallel axes.

The throttle valve 13 has a throttle slider 18 which slides in the housing 12 in a slider opening 19. The slider opening 19 is provided with ring-shaped extensions which are located near one another from the left to the right in the drawing and form a pressure chamber 21, an inlet chamber 22, an outlet chamber 23, and a spring chamber 24. The throttle slider 18 is loaded by a spring 25 located in the spring chamber 24, and also by the pressure in the spring chamber 24 and in the pressure chamber 21. For this purpose the pressure chamber 21 communicates with the outlet chamber 23 via a control passage 26 provided in the throttle slider 18. The spring 25 loads the throttle slider 18 in direction toward the shown initial position, in which a control bevel 27 formed on the throttle slider 18 completely controls the connection from the inlet chamber 22 to the outlet chamber 23. The inlet chamber 22 is connected via a first conduit portion 28 with an inlet 29 of the regulating directional valve 11. A working conduit 31 after the throttle valve 13 leads via the control valve 14 and the blocking unit 15 to an outlet 32. A second conduit portion 33 is a part of the working conduit 31 and leads from the outlet chamber 23 to the subsequent control valve 14.

The control valve 14 has a control slider 34 which is guided in a second slider opening 35 in a tight and sliding manner. The slider opening 35 has a first return chamber 36, a discharge chamber 37, a first control chamber 38, a second control chamber 39, a first working chamber 41, a second working chamber 42, and a second return chamber 43 arranged successively after one another from the left to the right as seen in the drawing. The outwardly located return chamber 36 and 43 are unloaded into a tank 44. The second portion 33 of the working conduit 31 opens into the first working chamber 41. A third conduit portion 45 is a part of the working conduit 31 and leads from the second working chamber 42 to the non-return valve 16. A first conduit portion 46 leads from the latter to the outlet 32. A check valve 47 which protects the second working chamber 42 is arranged in the third conduit portion 45. Further, a return conduit 48 leads from the outlet 32 via the non-return valve 16 to the discharge chamber 37 and further via the first return chamber 36 to the tank 44. A first control conduit 49 branches from the second conduit portion 33 of the working conduit 31 and leads to the tank 44. More particularly, it leads first into the first control chamber 38 and then from the second control chamber 39 leads further via a first throttle point 51 and a second throttle point 52 to the second return chamber 43, and finally to the tank 44. The first control conduit 49 has a branch 53 which is located in the region between both throttle points 51 and 52 and supplies through respective intermediate pressure to a pressure chamber 54 associated with the pushing piston 17. A second control conduit 55 connects the second working chamber 42 in the control valve 14 with the spring chamber 24 in the throttle valve 13.

A first control edge 56 is formed on the control slider 34 to control the pressure medium stream flowing via the working conduit 31 proportionally to the displacement of the control slider 34. In the shown neutral position of the control slider 34 the first control edge 56 interrupts the communication between the working chambers 41 and 42. Further, the control slider 34 has a second control edge 57 which in the respective manner controls the pressure medium stream discharging via the return conduit 48 to the tank. The second control edge 57 also interrupts in the shown neutral position the communication between the discharge chamber 37 and the first return chamber 36. The control slider 34 also has a third control edge 58 which provides the connection between both control chambers 38 and 39 and thereby influences a connection via the first control conduit 49 to the tank 44. In the neutral position the third control edge 58 interrupts the first control conduit 49. Furthermore, the control slider 34 has a fourth control edge 59 which influences the communication from the second working chamber 42 to the second return chamber 43 and thereby controls the unloading of the spring chamber 24 of the throttle valve 13. In the shown neutral position the fourth control edge 59 opens the above mentioned communication.

The control arrangement 10 has further an adjusting pump 61 with an associated adjusting device 62. The outlet of the adjusting pump 61 is connected with the inlet 29 of the regulating directional valve 11. A piston rod chamber 63 of the adjusting device 62 is loaded with the outlet pressure of the adjusting pump 61, so that the adjusting device 62 tends to adjust the adjusting pump 61 in direction of minimum feeding quantity. A regulating spring 65 is arranged in a cylinder chamber 64 of the adjusting device 62 and tends to adjust the adjusting pump 61 in direction of maximum feeding quantity. As long as no pressure medium is required from the hydraulic motor in the system, this feeding stream adjustment of the adjusting pump 61 by the regulating spring 65 ends with zero, and only the leakage losses in the system are compensated. The pressure which is generated by the adjusting pump 61 and depends on the force of the regulating spring 65 will be identified later on as an output pressure. The cylinder chamber 64 of the adjusting device 62 is connected with a medium connection 66 of a changeover valve 67. One side connection of the changeover valve 67 is connected via a first load pressure conduit 68 with the spring chamber 24 on the throttle valve 13. A second load pressure conduit 69 leads from another side connection of the changeover valve 67 to a second directional valve 71 for load-independent control, which is connected parallel to the regulating directional valve 11 at the outlet of the adjusting pump 61 and controls a second hydraulic motor 72. The second directional valve 71 has, in addition to a medium position 73, a first working position 74 and a second working position 75.

A single-acting hydraulic motor 76 which is connected at the output 32 of the regulating directional valve 11 is a power lift. It can actuate via a lifting arm 77 and a conventional three-point linkage 78, a plow 81 articulately connected with a tractor frame 79.

The regulating spring 65 in the adjusting device 62 is arranged so that the initial pressure applied by it to the adjusting pump 61 is insignificantly smaller than the pressure which is required depending on the spring 25 in the throttle valve 13 for switching the throttle slider 18.

The operation of the control arrangement 10 is as follows:

When the control slider 34 of the regulating valve 11 and the control slider in the second directional valve 71 are located in the shown neutral position, the first control edge 56 in the regulating directional valve 11 and the control slider in the second directional valve 71 interrupt respectively the communication to the hydraulic motor 76 and 72, so that the feeding stream of the adjusting pump 61 does not discharge. It flows, however, into the piston rod chamber 63 of the adjusting device 62 and controls the adjusting pump 61 in direction of the reducing feeding stream. The adjusting pump 61 supplies a small stream for compensation of leakage losses in the system. It operates against a so-called output pressure which depends on the force of the regulating spring 65 in the adjusting device 62. The cylinder chamber 64 in the adjusting device 62 is unloaded via the changeover valve 67, the first load pressure conduit 68, the second control conduit 55, and the opened fourth control edge 59 in the control valve 14, to the tank 44. This output pressure of the adjusting pump 61 acts in the throttling valve 13 via the control passage 26 also in the pressure chamber 21 and thereby upon the throttle slider 18 against the force of the spring 25. Since the force of the spring 25 is significantly prevailing, the spring 25 holds the throttle slider 18 in the shown initial position, and the control bevel 27 controls the working conduit 31. Since the second load pressure conduit 69 is unloaded via the second directional valve 71 to the tank 44, no pressure can build in the cylinder chamber 64 of the adjusting device 62. In this neutral position of the control slider 34 the first control edge 56 interrupts the communication between the working chambers 41 and 42. Simultaneously, the third control edge 58 interrupts the first control conduit 49, so that no control oil stream can discharge from the adjusting pump 61 via the first control conduit 49 to the tank 44. In addition, the pressure chamber 54 of the pushing piston is unloaded via a part of the first control conduit 49 to the tank 44, so that no undesirable pressure can build there. The non-return valve 16 in the pre-controlled seat valve type serves for reliably sealing the first hydraulic motor 76. Moreover, the second control edge 57 in the control valve 14 interrupts the return conduit 48.

When now the control slider 34 displaces to the left relative to the position shown in the drawing in direction of lifting, the first control edge 56 opens the communication from the first working chamber 41 to the second working chamber 42, whereas the fourth control edge 59 interrupts the communication from the working chamber 42 to the second return chamber 43. As a result of this, the prior-established pressure difference between both working chambers 41 and 42 decreases, which takes place in the same manner in the adjusting device 62 also in the piston rod chamber 63 and in the cylinder chamber 64. The regulating spring 65 can adjust, because of this, the adjusting pump 61 in direction of greater feeding stream, despite the fact that the feeding stream can find no outlet. The influence of the piston rod of the adjusting device 62 in connection with this can be neglected. The pressure at the output of the adjusting pump 61 increases so long, until the non-return valve 16 retained by the load from the hydraulic motor 76 is opened and the pressure medium from the adjusting pump 61 can flow via the working conduit 31 to the first hydraulic motor 76. Therefore the pressure medium stream flowing via the working conduit 31 is then adjusted to a new equilibrium and ends the movement of the adjusting device 63 in direction of increased feeding quantity when the pressure medium stream flowing via the first control edge 56 provides for such a pressure drop which is so great that it corresponds to the action of the regulating spring 65. Thus the throughflow cross section controlled by the first control edge 56 determines the value of the pressure medium stream flowing to the hydraulic motor 76, and the available pressure difference from the regulating spring 65 is determined and substantially constant. During this lifting step the throttling slider 18 remains in the shown initial position, since the pressure difference produced by the regulating spring 65 and acting on the pressure slider 18 is not sufficient to overcome the force of the spring 25. In addition, the position of the ball-shaped closing member in the changeover valve 67 is stable, since a definite load pressure acts in the first load pressure conduit 68, whereas the second load pressure conduit 69 is unloaded to the tank 44.

When during the above described lifting step with the regulating directional valve 11 the second hydraulic motor 72 with the aid of the second directional valve 71 is actuated, the above described functions of the directional regulating valve 11 do not change, as long as the pressure provided from the second hydraulic motor 72 is lower than the pressure required from the first hydraulic mtor 76. When, however, the pressure of the second hydraulic motor 72 provided in the first working position 74 of the second directional valve 71 is higher than the pressure in the first hydraulic motor 76, then this high load pressure travels via the second load pressure conduit 69 and the changeover valve 67 in the cylinder chamber 64. The regulating spring 65 can then adjust the adjusting pump 61 further in direction of increased feeding quantity. Simultaneously it increases the pressure drop via the first control edge 56 in the control valve 14. This increased pressure drop at the first control edge 56 acts simultaneously in the spring chamber 24 or the pressure chamber 21 and can now adjust the throttle slider 18 against the force of the spring 25 to the right; therefore its control bevel 27 throttles the working conduit 31. The pressure difference adjusting via the first control edge 56 at the control slider 34 is now determined by the force of the spring 25, and therefore stays substantially constant, independently of how high is the pressure at the output of the adjusting pump 61. The value of the pressure medium stream which during lifting of the hydraulic motor 76 flows through the working conduit 31, is thereby determined by the throughflow cross section controlled by the first control edge 56. This takes place in the event of the slightly increased pressure level, since the pressure difference acting from the spring 25 is only slightly above the outlet pressure difference generated by the regulating spring 65. Independently of this, the second hydraulic motor 72 can operate via the second directional valve 71 with the higher load pressure in parallel. A new equilibrium is adjusted when the pressure medium stream flowing from the adjusting pump 61 via the second directional valve 71 provides at the respective throttle 70 a pressure drop which corresponds to the action of the regulating spring 65.

When the control slider 34 is withdrawn from the lifting position into the shown neutral position, during which the control slider of the second directional valve 71 remains in its first working position 74, the pressure medium no longer flows from the adjusting pump 61 to the second hydraulic motor 72. The first hydraulic motor 76 is secured by the non-return valve 16. In this return position of the control slider 74 the fourth control edge 59 opens the communication from the second working chamber 42 to the tank 44. The spring chamber 24 in the throttle valve 13 is therefore unloaded to the tank. The control bevel 27 at the throttle slider 18 throttles the communication between the inlet chamber 22 and the outlet chamber 23, so that in the outlet chamber 23 and in the pressure chamber 21 a pressure determined by the force of the spring 25 is throttled. In the inlet chamber 22 a pressure acts whose value is the sum of the load pressure in the second hydraulic motor 72 and the pressure difference obtained from the regulating spring 65. Because of this pressure ratio in the throttle valve 13 and because of the condition that the first control edge 56 and the third control edge 58 in the control valve 14 are closed, the throttle slider 18 travels to the right so that at the control bevel 27 a limited positive overlapping is adjusted, so as to produce a compensated leakage balance.

When during the parallel actuation of the second directional valve 71 the control slider 34 in the regulating directional valve 11 displaces to the right from the neutral position to its lowering position, the third control edge 58 controls the communication between both control chambers 38 and 39, whereas simultaneously the second control edge 57 opens the return conduit 48. The outlet chamber 23 and thereby also the pressure chamber 21 in the throttle valve 13 are thereby unloaded via the first control conduit 49 to the tank 44. The spring 25 can therefore displace the throttle slider 18 from the above mentioned positive overlapping outwardly to the left, until no pressure medium stream flows via the control bevel 27. This control stream travels then via the first control conduit 49 and both throttle points 51 and 52 connected one behind the other, to the tank 44. This control stream, because of the throttle points 51 and 52, forms such a pressure in the outlet chamber 23, which corresponds to the action of the spring 25. Via the branch 53 the pressure formed between the throttle points 51 and 52 can also act in the pressure chamber 54 of the pushing piston 17 and open the pre-controlled non-return valve 16 with the aid of both the needle which couples both structural elements. The pressure medium can flow from the first hydraulic motor 76 via the return conduit 48 with the opened non-return valve 16 and the opened second control edge 57, to the tank 44. The check valve 47 located in the working conduit 33, 45 prevents that the pressure medium flowing back will flow via the second working chamber 42. The pressure required for pushing of the pushing piston 17 in the pressure chamber 54 can be adjusted easily with the aid of the dimensions of the throttle points 51 and 52. Because of this cascade-type connection at the control oil side and the manner of operation of the throttle slider 18, it is provided that the actuation pressure in the pressure chamber 54 is always independent of the working pressure produced by the adjusting pump 61. The lowering of the plow 81 can thereby be carried out independently from the parallel actuation of the second hydraulic motor 72 with always constant sensitivity.

When during the above described lowering step at the first hydraulic motor 76 the control slider of the second directional valve 71 is withdrawn from its first working position 74 to its medium position 73, the second hydraulic motor 72 is hydraulically blocked. Simultaneously the second load pressure conduit 69 in the second directional valve 71 is unloaded to the tank 44. This takes place also in the spring chamber 64 of the adjusting device 62. The working pressure supplied from the adjusting pump 61 acts in the piston rod chamber 63 and displaces the adjusting device 62 in direction of reducing feeding quantity of the adjusting pump 61. The adjusting pump 61 displaces in this direction for so long until the feeding stream produced by it is in exact correspondence with the control oil stream which flows via the first control conduit 69 with both throttle points 51 and 52 to the tank 44. Therefore, the above mentioned output pressure is adjusted because of the action of the regulating spring 65 at the output of the adjusting pump 61. As a result of this, the pressure in the pressure chamber 21 of the throttle valve 13 cannot be greater, and therefore the spring 25 displaces the throttle slider 18 from its throttling position back to the shown initial position. The operating pressure in the presure chamber 54, required for lowering of the first hydraulic motor 76, does not thereby change, since the regulating spring 65 has only an insignficantly smaller action than the spring 25 of the throttle valve 13. The position of the closing member in the changeover valve 67 is thereby again undetermined, since both load pressure conduits 69 and 68 are unloaded to the tank 34. When the control slider 34 is withdrawn from its lowering position to its neutral position, then again the position shown in the drawing is obtained.

With the above described control arrangement 10, a regulating directional valve 11 for controlling a single-acting power lift which must be especially tightly blocked, in a load-pressure-dependent operating system. The reactions of the regulating direction valve 11 are fully independent of the strongly different supply pressures. The control properties of the regulating directional valve 11 do not change during lifting and lowering of the power lift 76, when parallel thereto a second consumer 72 with different working pressures is operated.

Figure 2:
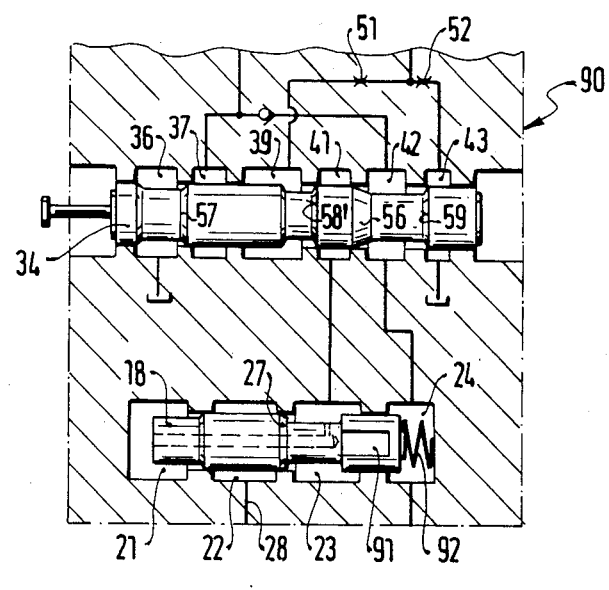
FIG. 2 is a view showing a partial longitudinal section of the hydraulic control arrangement in accordance with a second embodiment of the present invention.

FIG. 2 shows a part of a second regulating directional valve 90, which differs from the first regulated directional valve 11 of FIG. 1 in three points. The structural elements of the construction of FIG. 2 which are similar to the structural elements of the construction of FIG. 1 are identified with the same reference numerals.

In the second regulating directional valve 90, there is no first control chamber 38 with its connection to the working conduit 31. A third control edge 58' is displaced to the right so that it cooperates with a housing web between the second control chamber 39 and the first working chamber 41 and in such a manner that during displacement of the control slider 34 it is operative in a counterdirection to the first control edge 56. The control conduit 49 bridges as before upstream of the control slider 34 from the working conduit 31 or the first working chamber 41, so that despite the compact structure because of the absence of a control chamber 38 no changing functions of the regulating directional valve 90 take place.

Further, in the throttle slider 18 at the piston portion located between the outlet chamber 23 and the spring chamber 24, a control face 91 is provided. The control face 91 starting from a certain overlap at the control bevel 27 connects the outlet chamber 23 with the spring chamber 24. The control face 91 and the control bevel 27 operate in opposite directions relative to one another and allow a weak positive overlap of for example 0.5 mm, so that the outlet chamber 23 is hydraulically blockable.

The throttle slider 18 is loaded by a weak spring 92 which associated pressure is only a fraction of the pressure provided by the regulating spring 65, which produces the so-called output or standby pressure and amounts in particular to several bar, for example 4–6 bar.

The operation of the second regulating directional valve 90 differs from the operation of the first regulating directional valve 11 in the following:

In the event of the above described leakage balance during non-actuated control slider 34 and actuated second directional valve 71, at the throttle slider 18 in accordance with FIG. 1 during a positive overlap of the control bevel 27 a drifting of the throttle slider 18 can take place which makes difficult designing of the spring 25. Because of the control face 91, starting from a small positive overlap of for example 0.5 mm at the control face 27 the outlet chamber 27 is unloaded. Thereby the pressure in the outlet chamber 23 which drives the throttle slider and therefore in the presure chamber 21 drops so long until an equilibrium relative to the spring 92 is obtained. This takes place during opening of the control face 91 of approximately zero, since the withdrawn leakage stream is very small and the required cross section is also corresponding small. This leads to an exactly defined position of the throttle slider 18 and provides for an exact and easy design of the spring 92.

When the control face 91 is utilizable with the strong spring 25, a particularly advantageous combination is obtained in connection with the weak spring 92. When the influence of the spring 92 is weaker than the standby pressure difference obtained from the regulating spring 65, the throttle slider 18 is always located in the throttled condition. Via the first control edge 56 at the control slider 34 acts thereby only a small pressure difference produced by the spring 92, whereas the difference amount of the latter to the standby pressure difference drops at the control bevel 27. Therefore, for control slider 34 such slider elements can be used which can work in open circuits conventionally and with low bar pressure difference, in contrast to the control elements which operate in closed circuit and with a multiply higher pressure difference. The weak spring 92 has a favorable characteristic line, a compact structure and is inexpensive. In the energy balance no substantial difference takes place between the weak and the strong spring 25. Thereby at the first control edge 56 not only acts a small pressure drop actuated by the spring 92 in the neutral position. The latter acts also in the positions of lifting and lowering. Thus the control face 91 acts additionally so as to retain the pressure drop as exact as possible.

By the continuously throttling throttle slider 18, the pressure drop operative at the first control edge 56 remains always constant and is not determined changeably from the spring 25 or the regulating spring 65, so that a small springing which takes place with the strong spring 25 of FIG. 1 is avoided with the weak spring 92.

It is to be understood that changes are possible in the shown control arrangement without deviating from the inventive features. For example, the control slider 34 in the regulating direction of valve 11 can be actuated in arbitrary manner. Also, the constantly retained actuating pressure at the pushing piston 17 can be used in a known manner for regulation of the lowering stream. Instead of one second directional valve 71, also further directional valves can be connected and put into operation. Also, the control arrangement 10 is not limited to utilization for regulation of a plow. It can be used for solving similar problems, for example in construction vehicles and other vehicles.

It will be understood that each of the elements described above, or two or more together, may also find a useful application in other types of constructions differing from the types described above.

While the invention has been illustrated and described as embodied in an hydraulic control arrangement, it is not intended to be limited to the details shown, since various applications, modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An hydraulic control arrangement for a working device, particularly mounted on an agricultural vehicle, comprising a first hydromotor arranged to drive the working device; a blocking unit including a non-return valve and a pushing piston with a pressure chamber at said pushing piston; a control valve with a control slider arranged to control said blocking unit and having a first control edge which influences a pressure medium stream to said first hydromotor during lifting, and a second control edge; means forming an inlet and an outlet of the arrangement, said outlet being connected to said first hydromotor; a throttling valve having a throttle slider, a spring chamber with a spring, and a pressure chamber located opposite to said spring chamber unloading in a lowering position; a working conduit extending from said inlet via said throttle slider, said control slider and said non-return valve to said outlet, said throttle slider being located in said working conduit between said control slider and said inlet and being acted upon by spring in direction controlling said working conduit and also by a pressure difference at said first control edge in the opposite direction; a control conduit branching from said working conduit upstream of said control slider, said control conduit being influenced by said control slider and leading to said pushing piston; a tank to which said pressure chamber is unloaded in a lifting position; a second hydromotor with an associated directional valve; a throttle point; and a pressure medium source connected with said inlet and supplying with pressure medium said directional valve associated with said second hydromotor, said pressure chamber at said pushing piston being constantly unloaded to said tank via said throttle point, said throttle slider in a lowering position of said control slider being connected as a pressure-reducing valve with an output side with which said control conduit leading to said pushing piston is connected for reduced pressure.

2. An hydraulic control arrangement as defined in claim 1, wherein said control valve has at least six chambers associated with said control slider and including first and second working chambers associated with said first control edge, a discharge chamber and a first return chamber associated with said second control edge, a control chamber associated with said control conduit, and first and second return chambers located outwardly of said previously mentioned chambers.

3. An hydraulic control arrangement as defined in claim 2, wherein said working conduit has a conduit portion extending from said throttle slider and connected with said first working chamber, and another conduit portion leading to said blocking unit and connected with said second working chamber, said second working chamber being connected with said spring chamber of said throttle slider and being connectable by said control slider with said second return chamber.

4. An hydraulic control arrangement as defined in claim 3, wherein said throttling valve has inlet and outlet chambers located between said spring chamber and said pressure chamber, said throttle slider extending through said inlet and outlet chambers and into said spring and pressure chambers.

5. An hydraulic control arrangement as defined in claim 4, wherein said throttle slider has a control bevel influencing the communication between said inlet chamber and said outlet chamber, said control slider also having a control face which operates in an opposite direction relative to said control bevel and controls the connection from said outlet chamber to said spring chamber.

6. An hydraulic control arrangement as defined in claim 5, wherein said control bevel and said control face are so arranged relative to one another that they produce a positive overlap.

7. An hydraulic control arrangement as defined in claim 2, and further comprising a return conduit leading from said outlet via said non-return valve to said discharge chamber and also via said first return chamber to said tank, said control slider having a neutral position in which interrupts said working conduit, said control conduit and said return conduit and unloads said spring chamber of said throttle slider to said tank, a lifting position in which said unloading to the tank is interrupted, the working conduit is controlled and the control conduit and the return conduit are interrupted, and a lowering position in which said return conduit and said control conduit are controlled and the spring chamber is unloaded, whereas said working conduit is interrupted.

8. An hydraulic control arrangement as defined in claim 2, wherein said first working chamber is located at a supply side, said chambers being arranged so that between said supply-side working chamber and said discharge chamber, only one third control chamber is arranged.

9. An hydraulic control arrangement as defined in claim 1; and further comprising a further throttle point, said pressure medium source having adjusting means including an adjusting pump connected with said inlet and an adjusting device having a cylinder chamber with a regulating spring and a piston rod chamber and arranged so that said adjusting device is loaded by a working pressure of said adjusting pump in direction of reducing feeding quantity and by said regulating spring in direction of increasing feeding quantity; and a valve arranged to select a maximum pressure, said cylinder chamber of said regulating spring being connectable with said valve selecting maximum pressure or with a load pressure pick-up of said directional valve associated with said second hydromotor, said control conduit leading through said second throttle point to said tank and branching from said working conduit downstream of said throttle slider, and said pressure chamber of said throttling valve being connected with said working conduit downstream of said throttle slider.

10. An hydraulic control arrangement as defined in claim 9, wherein said valve for selecting a maximum pressure is formed as a changeover valve and has a middle connection which is connected said cylinder chamber which receives said regulating spring of said adjusting device.

11. An hydraulic control arrangement as defined in claim 9, wherein said regulating spring of said adjusting means and said spring of said throttling valve are arranged so that a pressure generated by said regulating spring and said adjusting means is only insignificantly smaller than the pressure generated by said spring of said throttling valve.

12. An hydraulic control arrangement as defined in claim 9, wherein said spring of said throttling valve and said regulating spring of said adjusting means are arranged so that a pressure generated by said spring of said throttling valve is substantially smaller than the pressure generated by said regulating spring of said adjusting means.

13. An hydraulic control arrangement as defined in claim 12, wherein said spring of said throttling valve is arranged so that the pressure generated by the same in the region of pressure drop used in open circuit is equal to several bar.

* * * * *